(12) United States Patent
Refson

(10) Patent No.: US 12,535,373 B2
(45) Date of Patent: Jan. 27, 2026

(54) PRESSURE TRANSITION INDICATOR AND VACUUM INSULATION PANEL EQUIPPED THEREWITH FOR SIGNALING LOSS OF VACUUM

(71) Applicant: PELI BIOTHERMAL LLC, Maple Grove, MN (US)

(72) Inventor: Neil Refson, Kirkcaldy (GB)

( * ) Notice: Subject to any disclaimer, the term of this patent is extended or adjusted under 35 U.S.C. 154(b) by 306 days.

(21) Appl. No.: 18/554,257

(22) PCT Filed: Apr. 8, 2022

(86) PCT No.: PCT/US2022/071625
§ 371 (c)(1),
(2) Date: Oct. 6, 2023

(87) PCT Pub. No.: WO2022/217270
PCT Pub. Date: Oct. 13, 2022

(65) Prior Publication Data
US 2024/0219250 A1    Jul. 4, 2024

Related U.S. Application Data

(60) Provisional application No. 63/172,766, filed on Apr. 9, 2021.

(51) Int. Cl.
*G01L 7/10* (2006.01)
*G01L 27/00* (2006.01)

(52) U.S. Cl.
CPC ............. *G01L 7/104* (2013.01); *G01L 7/102* (2013.01); *G01L 27/00* (2013.01)

(58) Field of Classification Search
CPC ......... G01L 7/102; G01L 7/104; G01L 27/00; H01H 35/24–405
See application file for complete search history.

(56) References Cited

U.S. PATENT DOCUMENTS 3,824,512 A * 7/1974 Glass ................ H01H 35/32
200/83 L
5,050,634 A * 9/1991 Fiechtner ............ G01L 19/12
137/486

(Continued)

FOREIGN PATENT DOCUMENTS

JP        H10239199 A     9/1998

OTHER PUBLICATIONS

Submission in Opposition Proceedings Made Following Summons to Attend Oral Proceedings, Dec. 8, 2021.

*Primary Examiner* — Alexander A Mercado
(74) *Attorney, Agent, or Firm* — Sherrill Law Offices, PLLC

(57) ABSTRACT

A remotely interrogatable pressure transition indicator (100) having a pressure sensitive element (110) interacting with a remotely interrogatable mechanical switch (120). The pressure sensitive element (110) is a hermetically sealed, gas impermeable, flexible walled sachet (110) containing a quantity of gas, operable for transitioning between inflated and deflated conditions induced by a change in external gaseous pressure experienced by the sachet (110). The sachet (110) interacts with the mechanical switch (120) to producing a first interrogatable value when the sachet (110) is inflated and a second interrogatable value when the sachet (110) is deflated.

20 Claims, 13 Drawing Sheets

(56) References Cited

U.S. PATENT DOCUMENTS

| | | | | |
|---|---|---|---|---|
| 5,331,126 | A * | 7/1994 | Dwyer | H01H 35/28 |
| | | | | 280/736 |
| 5,398,965 | A * | 3/1995 | Giurlando | B60R 21/268 |
| | | | | 280/735 |
| 5,504,288 | A * | 4/1996 | Morin | H01H 35/34 |
| | | | | 280/736 |
| 5,604,338 | A * | 2/1997 | Paxton | H01H 35/346 |
| | | | | 337/342 |
| 11,248,979 | B2 * | 2/2022 | Allard | G01L 1/04 |
| 2010/0116061 | A1 | 5/2010 | Caps | |
| 2013/0314720 | A1 | 11/2013 | Han et al. | |
| 2014/0262901 | A1 * | 9/2014 | Martino | B65D 25/00 |
| | | | | 206/459.1 |
| 2019/0195704 | A1 * | 6/2019 | Taniguchi | G01L 1/02 |
| 2021/0088403 | A1 * | 3/2021 | Allard | F25D 23/06 |
| 2024/0167907 | A1 * | 5/2024 | Miller | G01M 3/26 |

\* cited by examiner

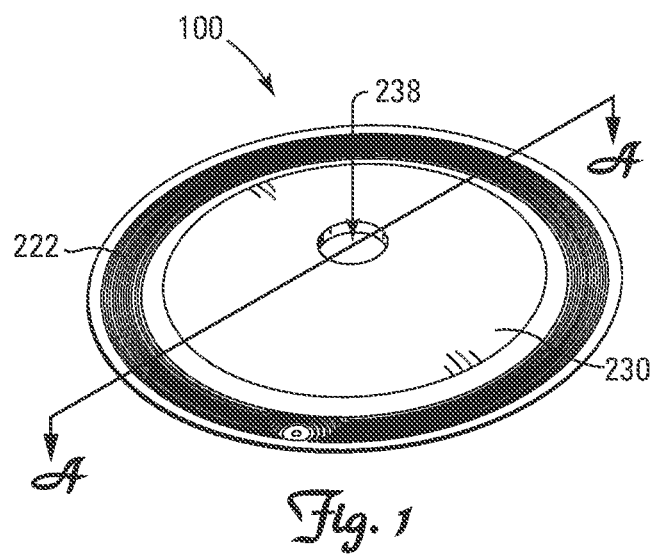
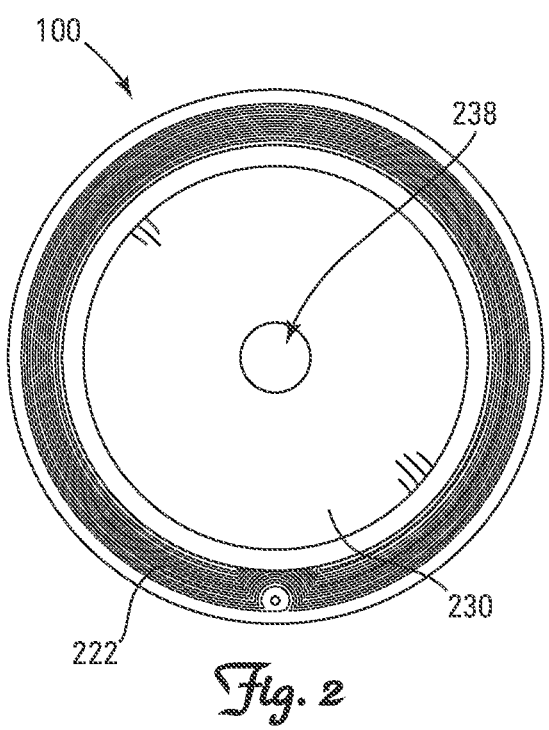
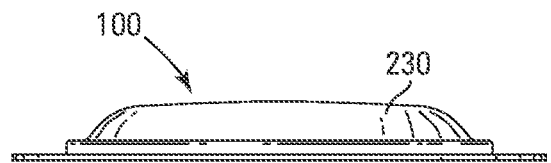

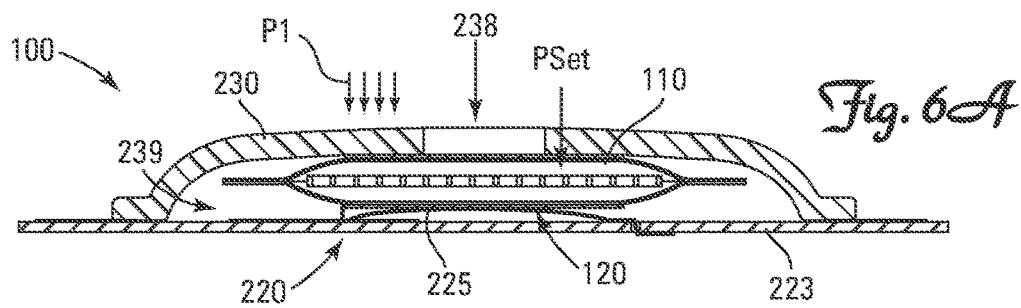
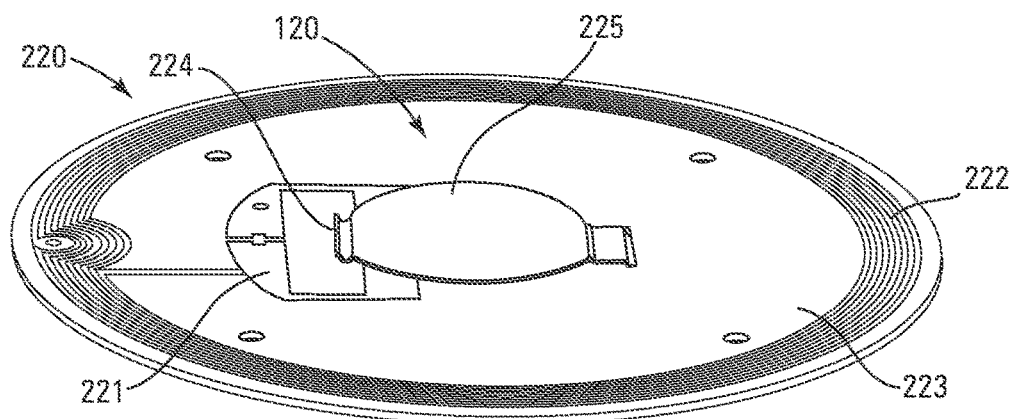
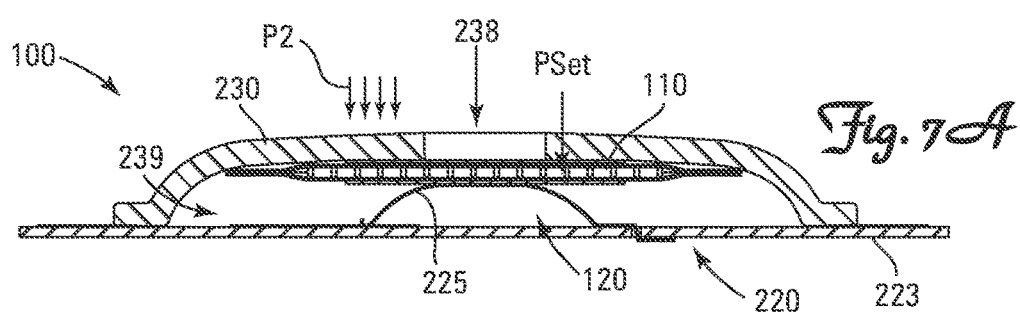
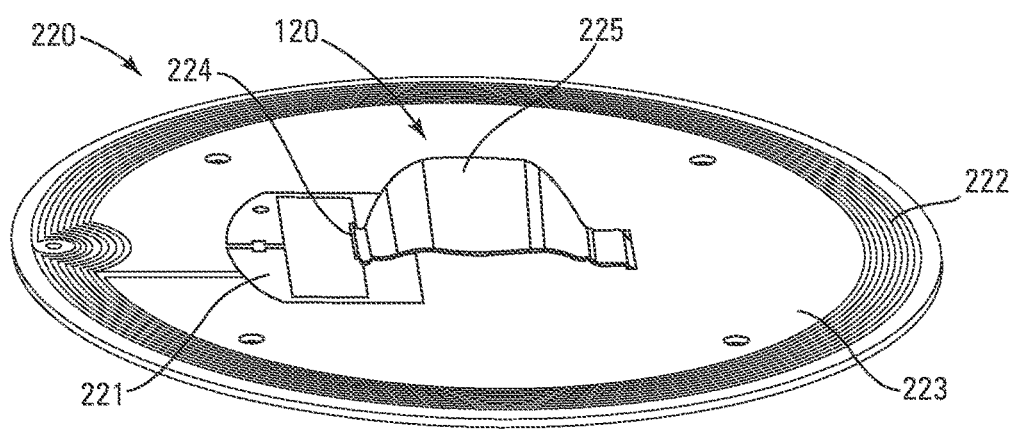

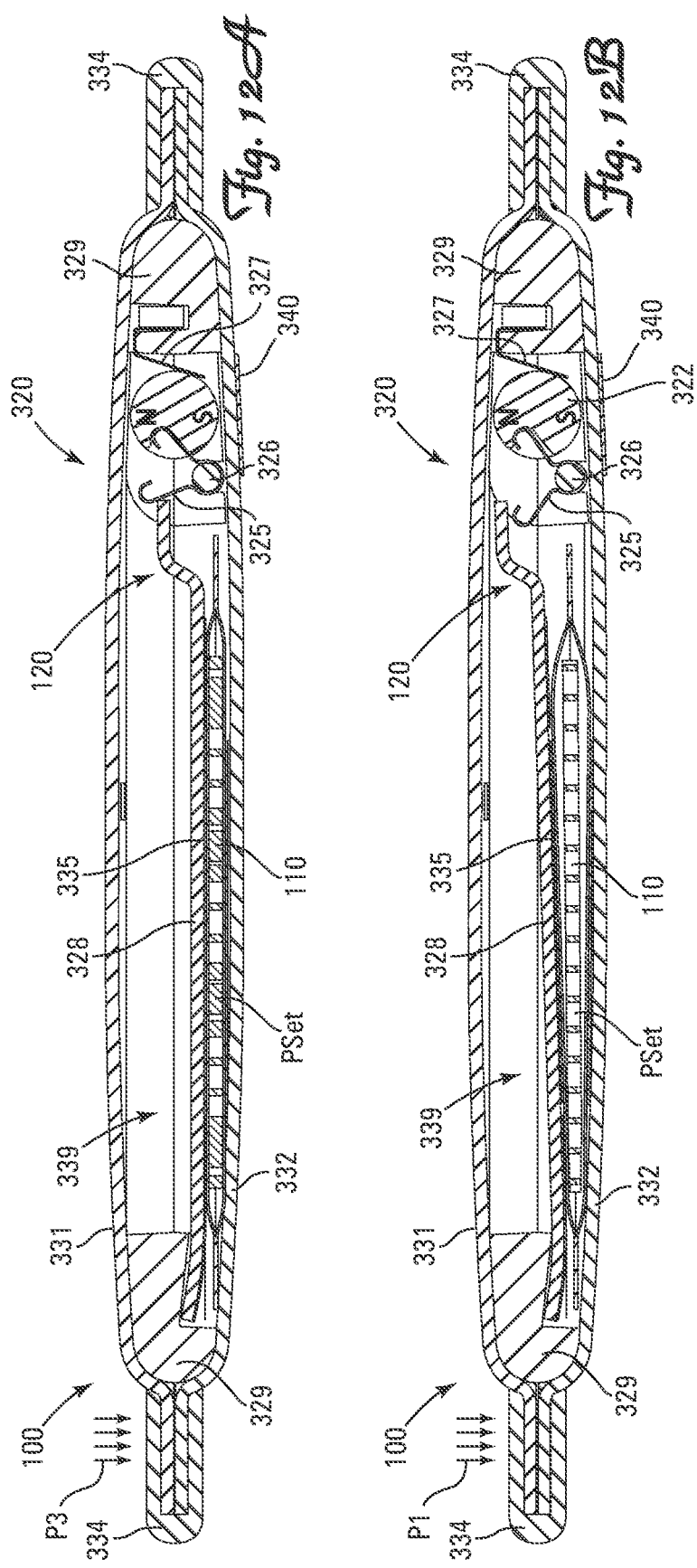

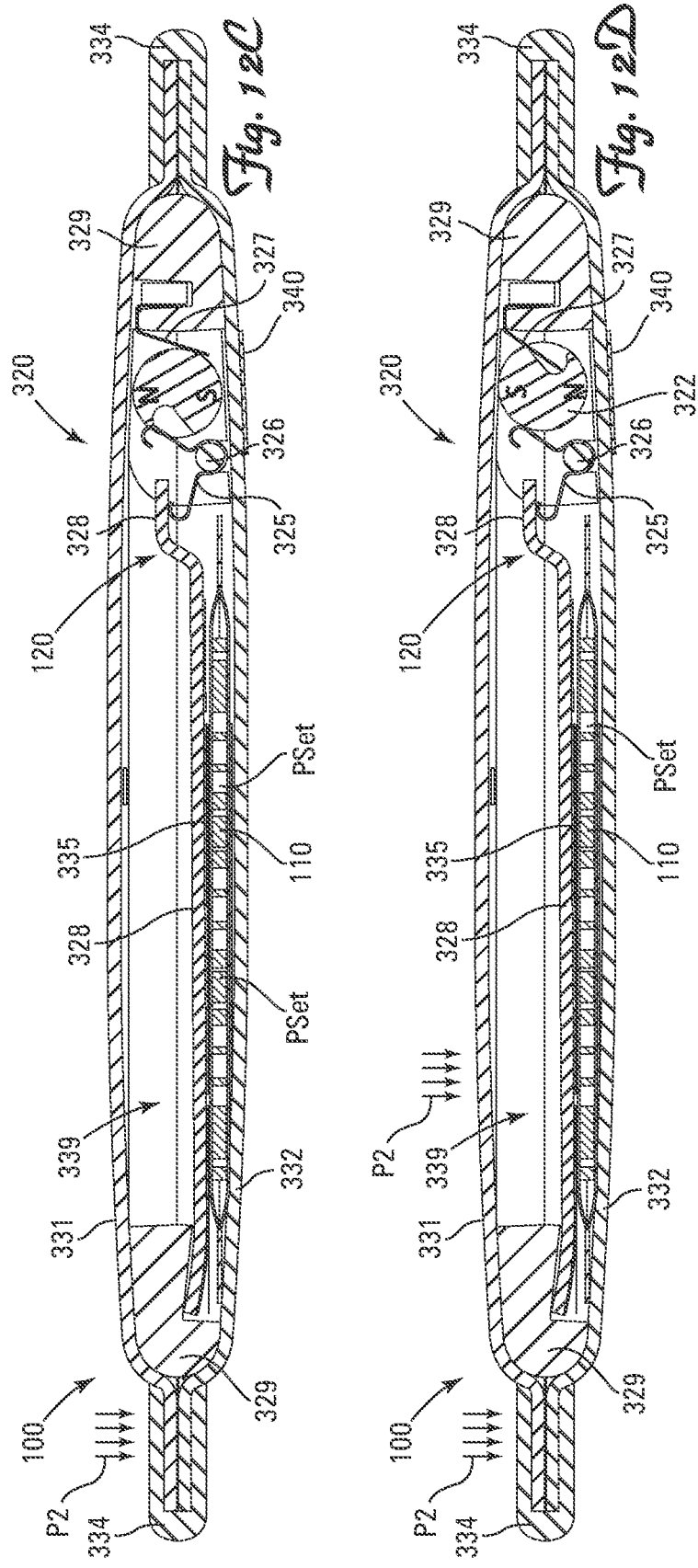

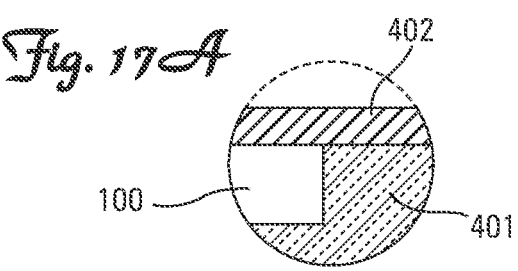
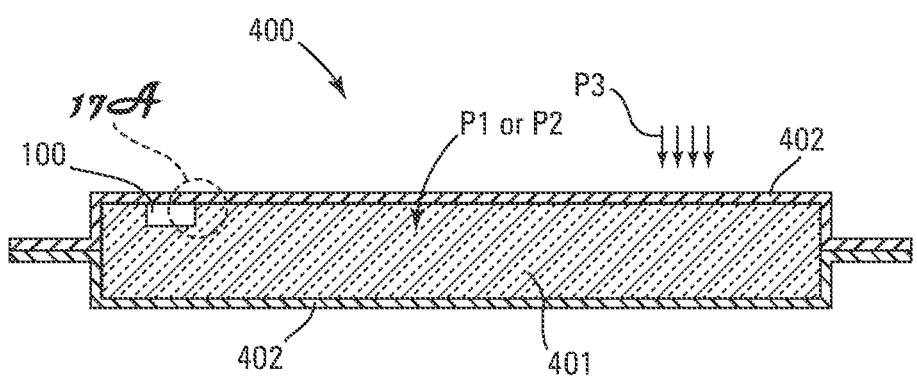

PRESSURE TRANSITION INDICATOR AND VACUUM INSULATION PANEL EQUIPPED THEREWITH FOR SIGNALING LOSS OF VACUUM

BACKGROUND

Vacuum insulation panels (VIPs) provide superior insulating value and are widely used for this reason. However, VIPs lose a substantial portion of their insulating value when the vacuum inside the panel is compromised.

Fully compromised or failed VIPs (i.e., internal pressure approaching atmospheric pressure) are relatively easy to detect with the naked eye as the outer envelope begins to visually bubble and warp. However, the insulating value of a VIP is substantially lost at internal pressures well below atmospheric pressure and should be replaced but such "moderate" losses in vacuum are not readily detectable with the naked eye.

Hence, a need exists for an inexpensive device capable of quickly and reliably indicating when a VIP has failed.

SUMMARY OF THE INVENTION

The invention is a remotely interrogatable pressure transition indicator. The indicator includes a pressure sensitive element and a remotely interrogatable mechanical switch.

The pressure sensitive element is operable for transitioning between first and second conditions induced by a change in external gaseous pressure experienced by the pressure sensitive element.

The remotely interrogatable mechanical switch is operable for transitioning between (i) a first state producing a first interrogatable value wherein the first state is indicative of a pressure induced status of the pressure sensitive element in the first condition representing a first external pressure experienced by the pressure sensitive element, and (ii) a second state producing a second interrogatable value different from the first interrogatable value, wherein the second state is indicative of a pressure induced status of the pressure sensitive element in the second condition representing a second external pressure experienced by the pressure sensitive element, wherein the first external pressure is lower than the second external pressure.

A preferred pressure sensitive element is a hermetically sealed, gas impermeable, flexible walled sachet containing a quantity of gas at a set pressure wherein (i) the first condition of the pressure sensitive element is an inflated condition caused when the sachet experiences an external pressure lower than the set pressure, and (ii) the second condition of the pressure sensitive element is a compressed condition caused when the sachet experiences an external pressure higher than the set pressure.

BRIEF DESCRIPTION OF THE DRAWINGS

All dimensional references in the Figures are exemplary dimensions set forth in mm units.

FIG. 1 is a perspective view of one embodiment of an RFID version of the invention.

FIG. 2 is a top view of the invention depicted in FIG. 1.

FIG. 3 is a side view of the invention depicted in FIG. 1.

FIG. 6A is a cross-sectional side view of the invention depicted in FIG. 1 taken along line A-A when the pressure transition indicator is experiencing a lower first external pressure placing the pressure sensitive element into the first inflated condition.

FIG. 6B is a perspective view of the RFID tag and spring with integrated electrically conductive connector depicted in FIG. 6A showing the integrated electrically conductive connector in the isolated position.

FIG. 7A is a cross-sectional side view of the invention depicted in FIG. 1 taken along line A-A when the pressure transition indicator is experiencing a higher second external pressure placing the pressure sensitive element into the second compressed condition.

FIG. 7B is a perspective view of the RFID tag and spring with integrated electrically conductive connector depicted in FIG. 7A showing the integrated electrically conductive connector in the shorting position.

FIG. 12A is a cross-sectional side view of the invention depicted in FIG. 8 taken along line B-B in an "as manufactured" conformation prior to having experienced a lower first external pressure (e.g., prior to placement within the evacuated chamber of a vacuum insulation panel).

FIG. 12B is a cross-sectional side view of the invention depicted in FIG. 8 taken along line B-B in an "armed" conformation after having experienced a lower first external pressure and before experiencing any subsequent higher second external pressure (e.g., retained within the evacuated chamber of a vacuum insulation panel).

FIG. 12C is a cross-sectional side view of the invention depicted in FIG. 8 taken along line B-B in a transitional conformation after having been armed and now beginning to experience a subsequent higher second external pressure (e.g., retained within the evacuated chamber of a vacuum insulation panel beginning to lose vacuum).

FIG. 12D is a cross-sectional side view of the invention depicted in FIG. 8 taken along line B-B in a "tripped" conformation after having been armed and subsequently experiencing a higher second external pressure (e.g., retained within the chamber of a vacuum insulation panel which has lost vacuum).

FIG. 17 is a cross-sectional view of a vacuum insulation panel equipped with a pressure transition indicator in accordance with the invention.

FIG. 17a is an enlarged view of a portion of the vacuum insulation panel equipped with a pressure transition indicator depicted in FIG. 17.

DETAILED DESCRIPTION OF A PREFERRED EMBODIMENT

Nomenclature

Figure 4:
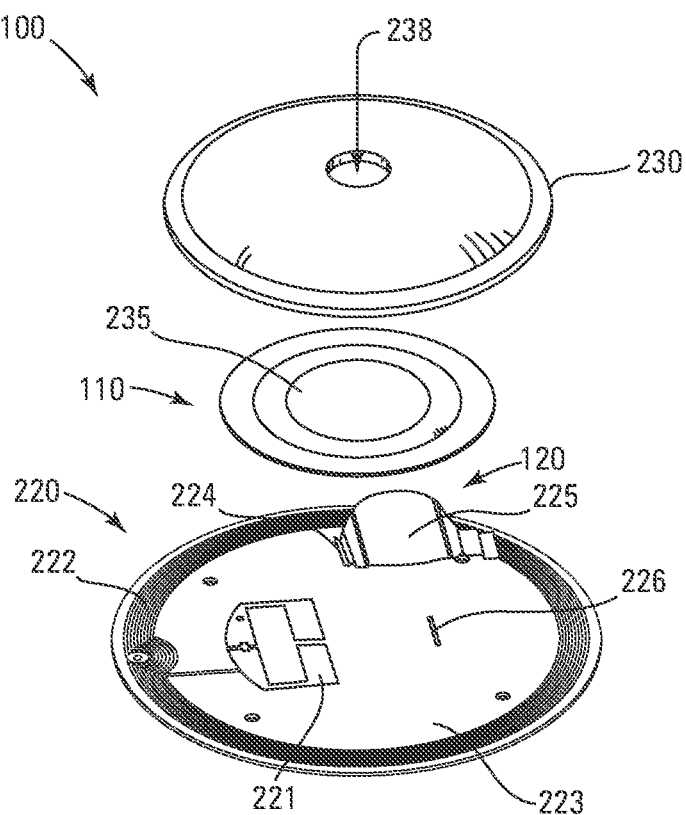
FIG. 4 is an exploded perspective view of the invention depicted in FIG. 1.
Figure 5:
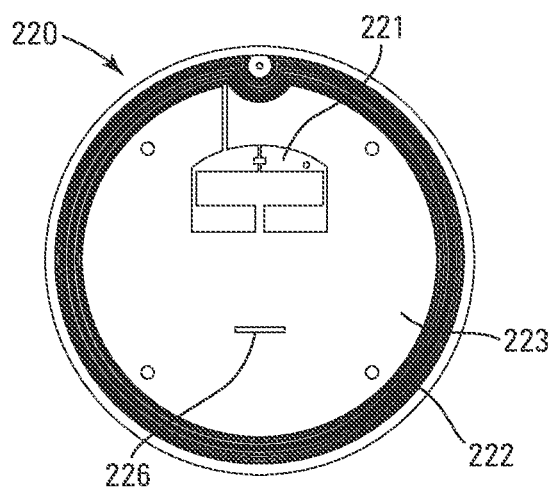
FIG. 5 is a top view of the RFID tag depicted in FIG. 4.
Figure 8:
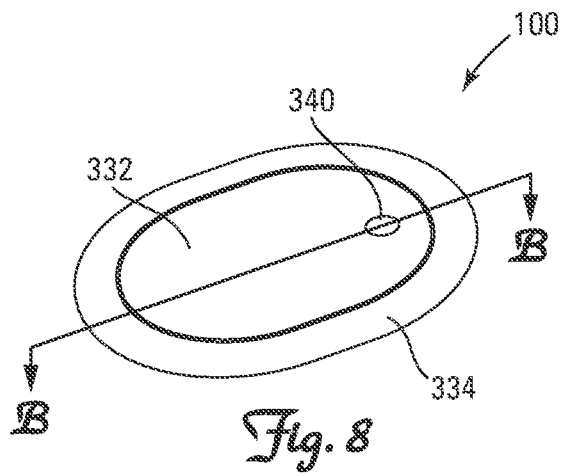
FIG. 8 is a perspective view of one embodiment of a magnetic version of the invention.
Figure 9:
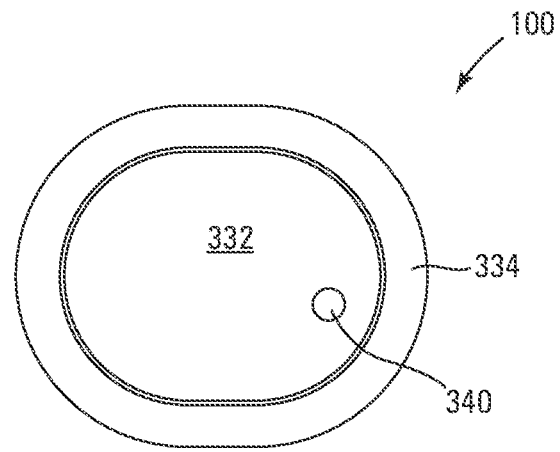
FIG. 9 is a top view of the invention depicted in FIG. 8.
Figure 10:
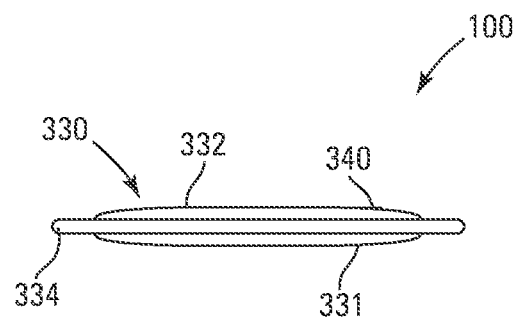
FIG. 10 is a side view of the invention depicted in FIG. 8.

| REF NO. | DESCRIPTION |
| --- | --- |
| 100 | Pressure Transition Indicator |
| 110 | Pressure Sensitive Element (Sachet) |
| 111 | Core with Void Volume |
| 112 | Air Impermeable Flexible Film |
| 113 | Seal |
| 120 | Mechanical Switch |
| 220 | RFID Switch |
| 221 | RFID Microchip |
| 222 | RFID Antenna |
| 223 | Substrate |
| 224 | Electrically Conductive Connector |
| 225 | Spring |
| 226 | Retention Slot for Spring |
| 227 | Spring Securement Bolts |
| 229 | Orifice Through Substrate |
| 230 | Housing |
| 231 | Top of Housing |
| 232 | Bottom of Housing |
| 235 | Protective Disc |
| 238 | Air Hole Through Housing |
| 239 | Chamber defined by Housing |
| 240 | Plunger |
| 241 | Base Plate of Plunger |
| 242 | Protuberance of Plunger |
| 320 | Magnetic Switch |
| 321 | Magnet |
| 322 | Magnet Retention Sleeve |
| 323 | Half Shafts for Magnet Retention Sleeve |
| 324 | Biasing Torsion Spring for Magnet Retention Sleeve |
| 325 | Restraining Element (v-shaped pawl) |
| 326 | Bar for Pivotable Retention of Restraining Element |
| 327 | Stop for Limiting Rotation of Magnet Retention Sleeve |
| 328 | Actuator Plate |
| 329 | Frame |
| 330 | Housing |
| 331 | Top of Housing |
| 332 | Bottom of Housing |
| 333 | Adhesive Layer |
| 334 | Protective Peripheral Surround |
| 335 | Protective Disc |
| 338 | Air Holes Through Housing |
| 339 | Chamber defined by Housing |
| 340 | Magnet Location Marker |
| 400 | Vacuum Insulation Panel |
| 401 | Core of Vacuum Insulation Panel |
| 402 | Gas Impermeable Film Hermetically Enclosing the Core |
| N | North Magnetic Pole |
| S | South Magnetic Pole |
| $P_1$ | Lower External Gas Pressure |
| $P_2$ | Higher External Gas Pressure |
| $P_3$ | Atmospheric Pressure |
| $P_{Set}$ | Set Gas Pressure |

Construction

The invention is a remotely interrogatable pressure transition indicator 100 for indicating pressure changes between a lower external gas pressure $P_1$ and a higher external gas pressure $P_2$.

The pressure transition indicator 100 includes a pressure sensitive element 110 and a remotely interrogatable mechanical switch 120.

The pressure sensitive element 110 is a device operable for transitioning between first and second conditions induced by a change in external gaseous pressure experienced by the pressure sensitive element 110.

The remotely interrogatable mechanical switch 120 is any device operable for transitioning between (i) a first state producing a first interrogatable value wherein the first state is indicative of a pressure induced status of the pressure sensitive element 110 in the first condition representing a first external pressure $P_1$ experienced by the pressure sensitive element 110, and (ii) a second state producing a second interrogatable value different from the first interrogatable value, wherein the second state is indicative of a pressure induced status of the pressure sensitive element 110 in the second condition representing a second external pressure $P_2$ experienced by the pressure sensitive element 100, wherein the first external pressure $P_1$ is lower than the second external pressure $P_2$.

Pressure Sensitive Element 110

The pressure sensitive element 110 can be a hermetically sealed, gas impermeable, flexible walled sachet 110 containing a quantity of gas creating an internal set pressure $P_{Set}$ which is between a first lower external pressure $P_1$ and a second higher external pressure $P_2$. By providing the sachet 110 with an internal set pressure $P_{Set}$ between a first lower external pressure $P_1$ and a second higher external pressure $P_2$, the internal set pressure $P_{Set}$ will inflate the sachet 110 into the first condition when the sachet 110 experiences the lower external pressure $P_1$ (See, FIGS. 6A and 12B) and the surrounding pressure will compress the sachet 110 into the second condition when the sachet 110 experiences the higher external pressure $P_2$ (See, FIGS. 7A and 12D).

Referring to FIGS. 13-16, the sachet 110 can be conveniently formed by enclosing a porous core 111 between upper and lower gas impermeable flexible films 112 and then heat sealing the films 112 together to form a hermetic seal 113 around the periphery of the porous core 111 while the sachet 110 is retained within a vacuum chamber (not shown) at the set pressure $P_{set}$. A particularly suitable gas impermeable film 112 is a metalized barrier layer laminated to a thermoplastic heat weldable layer such as utilized in the manufacture of vacuum insulation panels. Other configurations, arrangements and techniques may also be employed.

Remotely Interrogatable Mechanical Switch 120

The remotely interrogatable mechanical switch 120 can be a combination of an electronic transmitter and a low electrical resistance connector whereby the low electrical resistance connector is repositionable relative to the electronic transmitter to switch the transmitter between the interrogatable states of on/off, operable/inoperable/, effective/ineffective, open/closed, separated/shorted, armed/triggered, etc. (hereinafter collectively referenced for convenience as on/off).

RFID Switch 220

Referring to FIGS. 1-5, 6A, 6B, 7A and 7B, one embodiment of a remotely interrogatable mechanical switch 120 is an RFID Switch 220 that includes an RFID microchip 221 and an RFID antenna 222 mounted on a substrate 223 (collectively referenced as an RFID tag), and an electrically conductive connector 224 formed on a spring 225 for biased positioning of the electrically conductive connector 224 into a first position and permitting forced repositioning of the electrically conductive connector 224 against the bias into a second position to effect on/off switching of the RFID tag.

One end of the spring 225 is anchored in position relative to the RFID tag, such as by passage of the end through a retention slot 226 in the substrate 223.

A housing 230 can be secured to the substrate 223 to enclose the pressure sensitive element 110 and the mechanical switch 120 within a chamber 239. An air hole 238 can be provided through the housing 230 to ensure that the pressure sensitive element 110 experiences any pressure changes outside of the chamber 239. Location of the air hole 238 over the spring 225 can permit mechanical depression of the spring 225 against the bias with a pin (not shown) inserted through the air hole 238 so as permit mechanical repositioning of the electrically conductive connector 224 between the first and second positions for testing.

Referring to FIGS. 4, 6A and 7A, the sachet 110 is positioned between the spring 225 and the housing 230. In this position (i) when the pressure surrounding the sachet 110 is less than the set pressure $P_{Set}$ (e.g., experiencing the internal vacuum of an operational vacuum insulation panel), the sachet 110 expands and forcibly presses against the spring 225 to move the electrically conductive connector 224 into the second position against the bias (FIG. 6A), and (ii) when the pressure surrounding the sachet 110 is greater than the set pressure $P_{Set}$ (e.g., experiencing the internal vacuum of a failed vacuum insulation panel), the sachet 110 is compressed by the higher external pressure and releases the spring 225 so as to allow the bias to move the electrically conductive connector 224 into the first position (FIG. 7A).

A rigid protective disc 235 may positioned between the sachet 110 and the housing 230 to prevent the rather fragile flexible sachet 110 from expanding into the air hole 238 or being punctured by contact with any corners or edges on the housing 230 or any mechanical pin inserted through the air hole 238 for testing.

Referring to FIGS. 18-21, another embodiment of a remotely interrogatable RFID Switch 220 suitable for use as the mechanical switch 120 in the remotely interrogatable pressure transition indicator 100 is an RFID Switch 220 that includes an RFID microchip 221 and an RFID antenna 222 mounted on a substrate 223 (collectively referenced as an RFID tag), and an electrically conductive connector 224 on the free end of a leaf spring 225 for biased positioning of the electrically conductive connector 224 into a first contact position and permitting forced repositioning of the electrically conductive connector 224 against the bias into a second noncontact position to effect on/off switching of the RFID tag.

One end of the leaf spring 225 is anchored in position relative to the substrate 223 and the RFID tag, such as with a pair of bolts 227 threadably engaging the substrate 223.

A housing 230 is secured to the substrate 223 to enclose the pressure sensitive element 110 and the mechanical switch 120 within a chamber 239. An air hole 238 can be provided through the top 231 and bottom 232 of the housing 230 to ensure that the pressure sensitive element 110 experiences any pressure changes outside of the chamber 239.

Referring to FIGS. 18-21, a plunger 240 is positioned between the substrate 223 and the bottom 232 of the housing 230. The plunger 240 has a planar base 241 and a protuberance 242 slidably projecting through an orifice 229 in the substrate 223 located immediately underneath the leaf spring 225.

Figure 20:
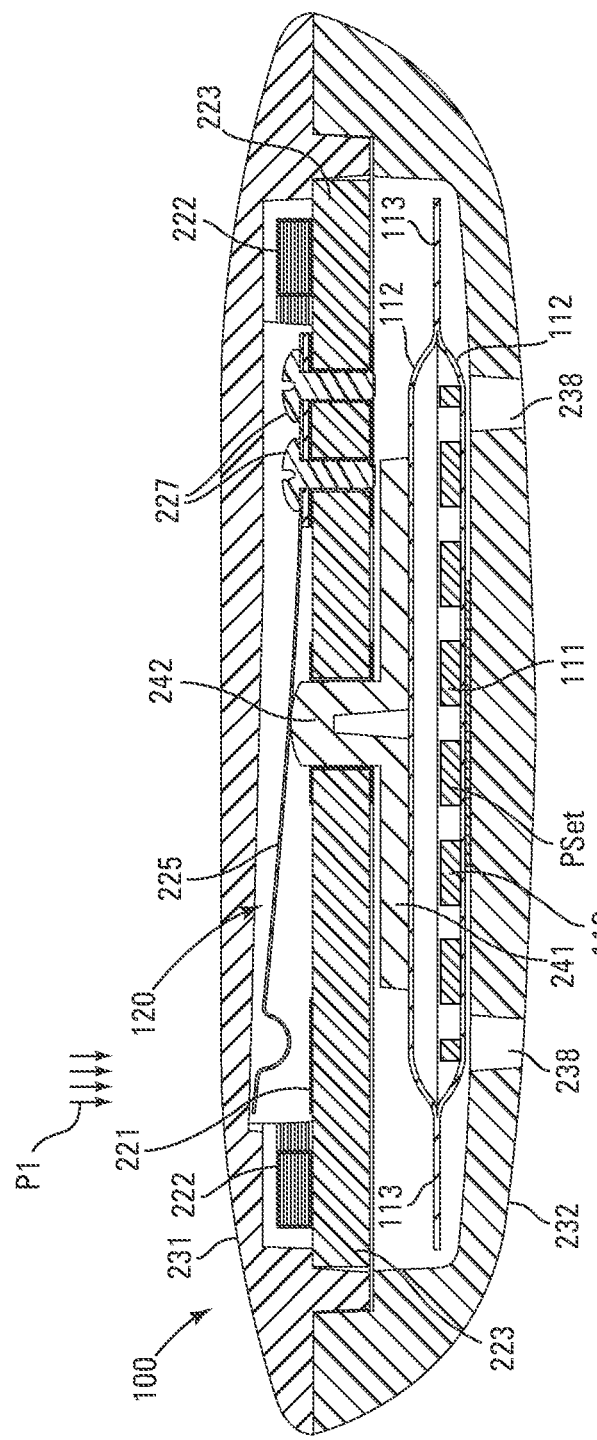
FIG. 20 is a cross-sectional view of the invention depicted in FIG. 19 taken along line C-C when the pressure transition indicator is experiencing a lower first external pressure placing the pressure sensitive element into the first inflated condition.
Figure 21:
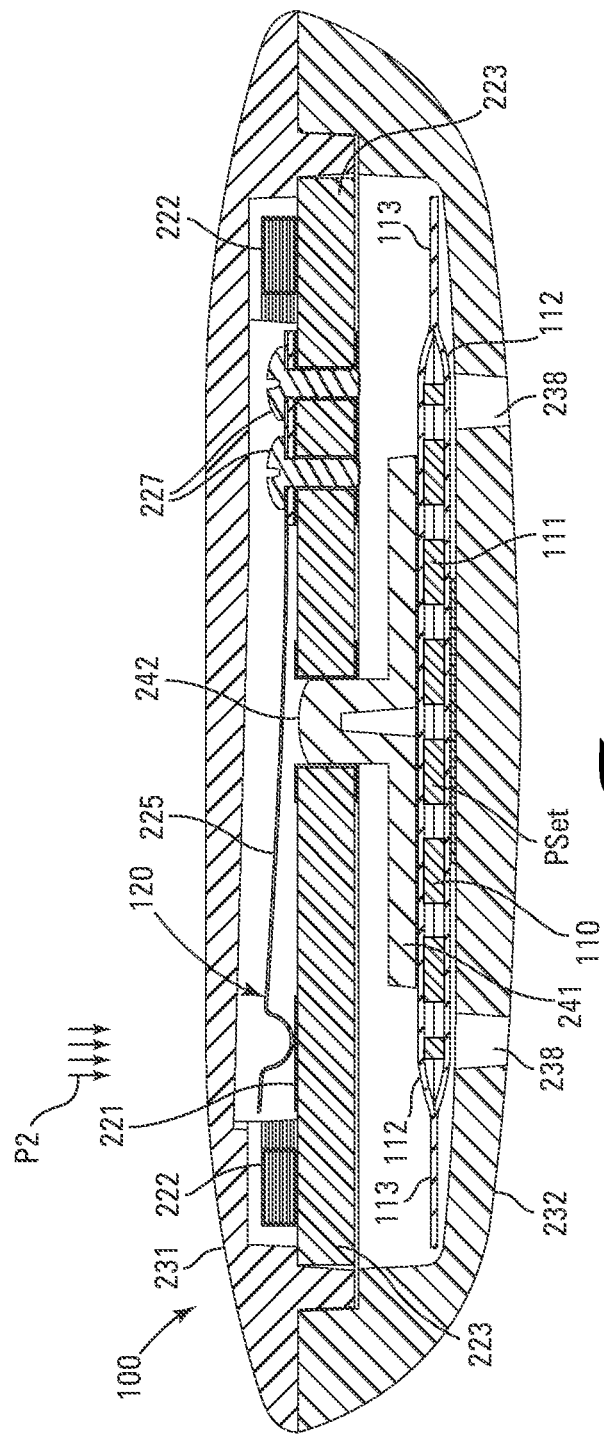
FIG. 21 is a cross-sectional view of the invention depicted in FIG. 19 taken along line C-C when the pressure transition indicator is experiencing a higher second external pressure placing the pressure sensitive element into the second compressed condition.

The sachet 110 is positioned between the base 241 of the plunger 240 and the bottom 232 of the housing 230. The height differential of the sachet 110 between inflated and deflated conditions is operable for (i) allowing the bias of the leaf spring 225 to push the protuberance 242 downward relative to the substrate 223 a distance sufficient to allow the electrically conductive connector 224 on the leaf spring 225 to engage the RFID tag when the sachet 110 is deflated (FIG. 21), and (ii) lifting the protuberance 242 relative to the substrate 223 a distance sufficient to push the protuberance 242 upward against the bias of the leaf spring 225 a distance relative to the substrate 223 sufficient to lift the electrically conductive connector 224 on the leaf spring 225 off from and out of engagement with the RFID tag when the sachet 110 is inflated (FIG. 20). In other words, (i) when the pressure surrounding the sachet 110 is less $P_1$ than the set pressure $P_{Set}$ (e.g., experiencing the internal vacuum of an operational vacuum insulation panel), the sachet 110 expands and lifts the plunger 240 which in turn lifts the electrically conductive connector 224 on the leaf spring 225 off from the RFID tag so as to permit the RFID tag to transmit a first signal when interrogated (FIG. 20), and (ii) when the pressure surrounding the sachet 110 is greater $P_2$ than the set pressure $P_{Set}$ (e.g., experiencing the internal vacuum of a failed vacuum insulation panel), the sachet 110 is compressed by the higher $P_2$ external pressure, allowing the bias of the leaf spring 225 to push the plunger 240 downward relative to the substrate 223 a distance sufficient to allow the electrically conductive connector 224 on the leaf spring 225 to engage and short the RFID tag so as to cause the RFID tag to transmit a second signal (i.e., no signal) when interrogated (FIG. 21).

A rigid protective disc 235 may positioned between the sachet 110 and the bottom 232 of the housing 230 to prevent the rather fragile flexible sachet 110 from expanding into the air hole 238 or being punctured by contact with any corners or edges on the housing 230.

Magnetic Switch 320

Referring to FIGS. 8-11, and 12A-D, another embodiment of a remotely interrogatable mechanical switch 120 is a magnetic switch 320 that includes a repositionable magnet 321 having north N and south S magnetic poles biased towards a second orientation of the north N and south S poles, a restraining element 325 for maintaining orientation of the north N south S poles in a first orientation against the bias until actuated, and a repositionable actuator plate 328 actuating the restraining element 325 when repositioned from a first position to a second position.

Figure 11:
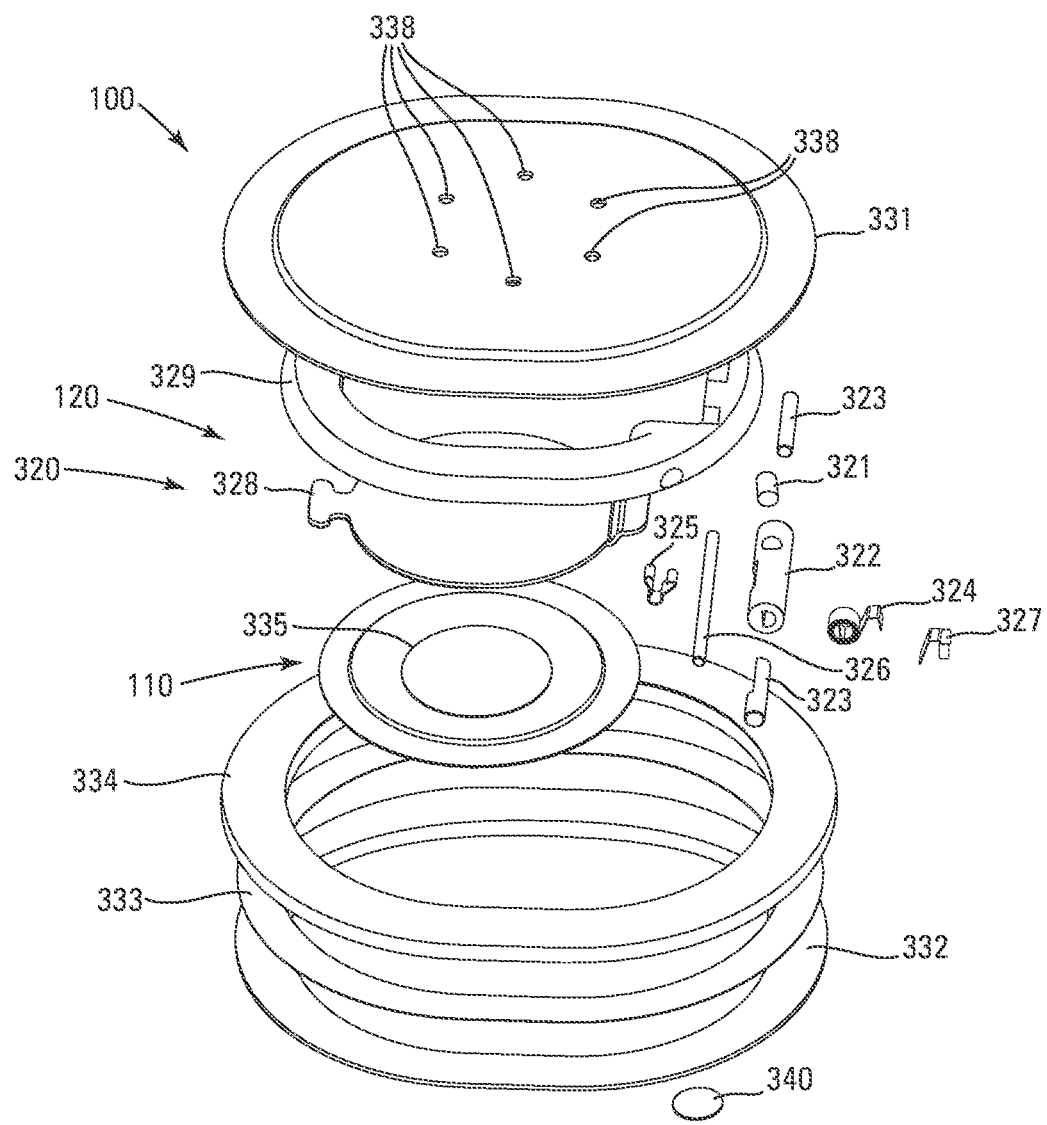
FIG. 11 is an exploded perspective view of the invention depicted in FIG. 8.
Figure 13:
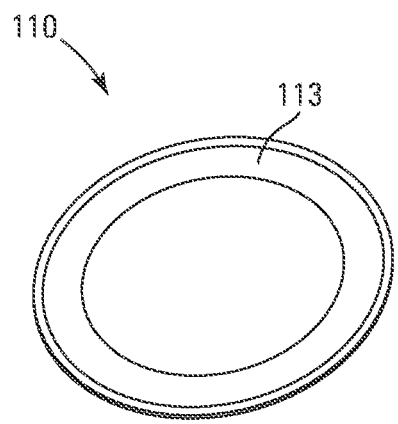
FIG. 13 is a perspective view of one embodiment of the pressure sensitive element depicted in FIGS. 1 and 8.
Figure 14:
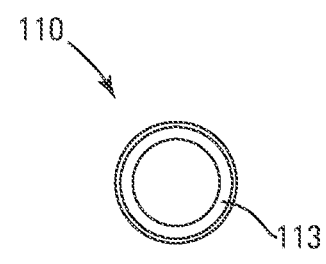
FIG. 14 is a top view of the pressure sensitive element depicted in FIG. 13.
Figure 15:
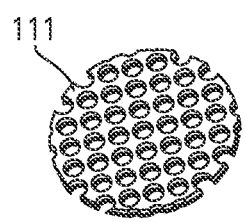
FIG. 15 is a perspective view of one embodiment of the core component of the pressure sensitive element depicted in FIG. 13.
Figure 16:
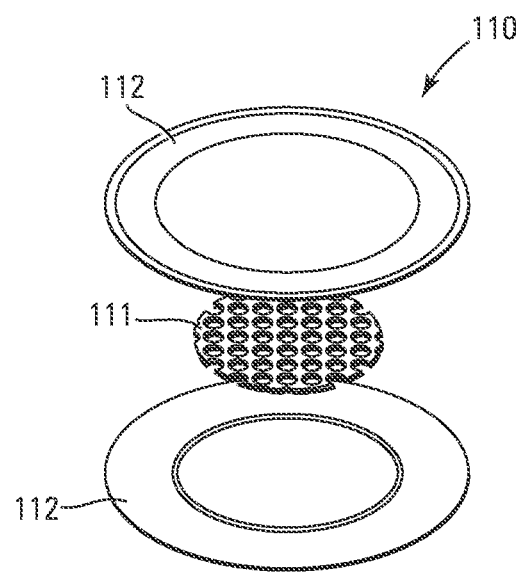
FIG. 16 is an exploded perspective view of the pressure sensitive element depicted in FIG. 13.
Figure 18:
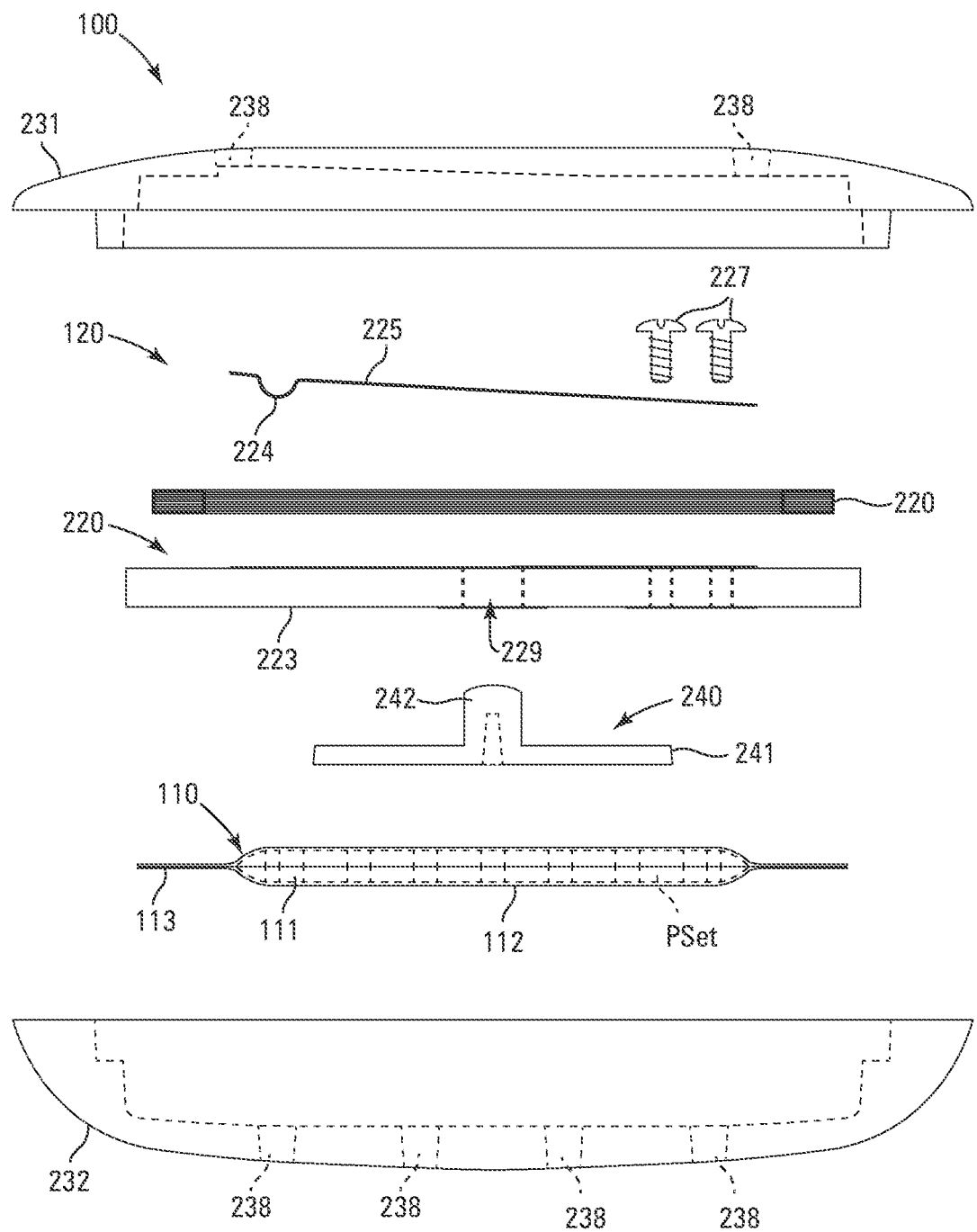
FIG. 18 is an exploded side view of a second embodiment of an RFID version of the invention.
Figure 19:
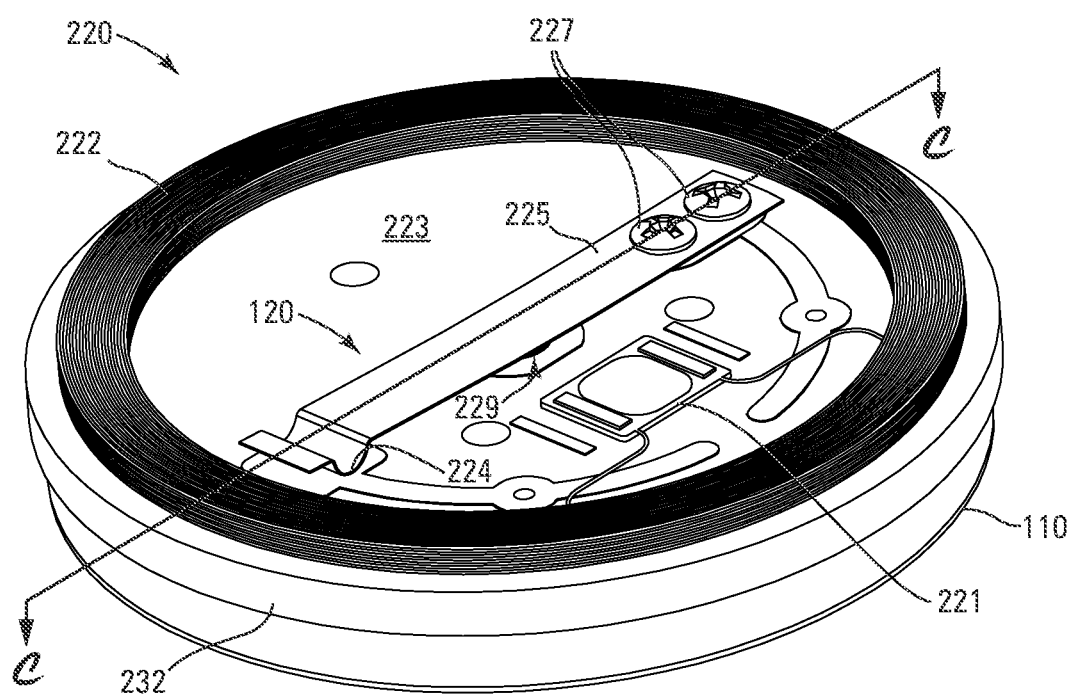
FIG. 19 is a top perspective view of the internal components of the invention depicted in FIG. 18.

Referring to FIG. 11, one option for rendering the magnet 321 repositionable between the first and second orientations is to radially retain the magnet 321 within an axially rotatable hollow retention sleeve 322 which is rotatably secured to a frame 329 by axially extending half shafts 323.

Biasing of the magnet 321 towards the second orientation can be achieved with a torsion spring 324 secured at one end to the retention sleeve 322 and secured at the other end to the frame 329 for providing a biased axial rotation to the retention sleeve 322 from the first orientation of the magnet 321 (FIGS. 12A, 12B and 12C) towards the second orientation of the magnet 321 (FIG. 12D).

One embodiment of the restraining element 325 is a v-shaped pawl 325 pivotally secured in position on the frame 329 via a bar 326. One leg of the v-shaped pawl 325 is positioned for removable insertion within a groove (unnumbered) in the retention sleeve 322 while the other leg is positioned for selective contact with the actuator plate 328 (FIGS. 21A and 12B). When the one leg of the v-shaped pawl 325 is positioned within the groove (unnumbered) in the retention sleeve 322, biased rotation of the retention sleeve 322 from the first orientation into the second orientation is inhibited. Removal of the one leg of the v-shaped pawl 325 from the groove (unnumbered) allows biased rotation of the retention sleeve 322 into the second orientation where the groove encounters a stop 327 extending from the frame 329 to prevent rotation of the retention sleeve 322 beyond the second orientation (FIG. 12D).

Referring to FIGS. 11 and 12A-D, the actuator plate 328 has a first end secured to the frame 329 distal to the v-shaped pawl 325 and a second end positioned proximal the v-shaped pawl 325 for selective engagement with the other leg of the v-shaped pawl 325. The actuator plate 328 is biased towards a position that engages the other leg of the v-shaped pawl 325 to effect removal of the one leg of the v-shaped pawl 325 from the groove (unnumbered).

Referring to FIG. 11, a housing 330 comprised of housing halves 331 and 332 peripherally bonded together by an adhesive layer 333 enclose the pressure sensitive element 110 and the mechanical switch 120 within a chamber 339. Air holes 338 can be provided through the housing 330 to ensure that the pressure sensitive element 110 experiences any pressure changes outside of the chamber 339. A protective peripheral surround 334 can be provided to cover any sharp edges or burrs on the periphery of the housing 330.

Referring to FIGS. 11 and 12A-D, the sachet 110 is positioned between the actuator plate 328 and the bottom of the housing 332. In this position (i) when the pressure surrounding the sachet 110 is less than the set pressure $P_{Set}$ (e.g., experiencing the internal vacuum of an operational vacuum insulation panel), the sachet 110 is expanded and forcibly pushes the actuator plate 328 against the bias into a disengaged position away from the other leg of the v-shaped pawl 325 (FIG. 12B), and (ii) when the pressure surrounding the sachet 110 is greater than the set pressure $P_{Set}$ (e.g., experiencing the internal vacuum of a failed vacuum insulation panel), the sachet 110 is compressed by the higher external pressure and releases the actuator plate 328 so as to allow the bias to move the actuator plate 328 into forcible engagement against the other leg of the v-shaped pawl 325, thereby effecting removal of the one leg of the v-shaped pawl 325 from the groove (unnumbered) in the retention sleeve 322 and allowing biased rotation of the retention sleeve 322 from the first orientation into the second orientation (FIGS. 12C and 12D).

A rigid protective disc 335 may positioned between the sachet 110 and the actuator plate 328 to prevent damage to the rather fragile flexible sachet 110.

A magnet location marker 340 (e.g., a raised adhesive dot) may be placed on the exterior of the housing 330 to indicated location of the magnet 321 for remote reading of the orientation of the magnet 321 with a reader (not shown).

Failure Indicating Vacuum Insulation Panel 400

Referring to FIG. 17, the remotely interrogatable pressure transition indicator 100 is ideally suited for incorporation within a vacuum insulation panel (VIP) 400 between the core 401 and the gas impermeable film 402 for indicating, upon interrogation through the gas impermeable film 402 with a reader (not shown), the condition of the vacuum within the VIP 400 as between satisfactory (good vacuum) and unsatisfactory (loss of vacuum).

Operation

The pressure transition indicator 120 operates within a VIP 400 as follows.

The sachet 110 is filled with gas at a set pressure $P_{Set}$ between the anticipated vacuum pressure $P_1$ of the VIP 400 and atmospheric pressure $P_3$. $P_{Set}$ is preferably set to a pressure at which the loss of vacuum starts causing the VIP 400 to fail as a thermal insulator. Depending in large measure upon the material used for the core 401 of the VIP 400, VIPs 400 tend to lose significant thermal insulating value as the pressure inside the VIP 400 increases to between 1 and 200 millibars and more specifically between 50 and 200 millibars, and lose substantially all insulation value at pressures exceeding 1000 millibars.

RFID Switch Embodiment 220

Referring to FIGS. 7A and 7B, prior to placing an assembled RFID switch embodiment 220 of the pressure transition indicator 100 into a VIP 400 and evacuating the core 401, the sachet 110 experiences atmospheric pressure $P_3$ which is higher that the set pressure $P_{Set}$ and the sachet 110 is compressed. In this state the RFID tag is shorted and rendered inoperable.

Referring to FIGS. 6A and 6B, after placing the RFID switch embodiment 220 of the pressure transition indicator 100 into an evacuated and fully sealed VIP 400, the sachet 110 experiences lower vacuum pressure $P_1$ which is lower than the set pressure $P_{set}$ and the sachet 110 is inflated. In this state the RFID tag is not shorted and becomes operable.

Referring again to FIGS. 7A and 7B, should the VIP 400 begin to fail the sachet 110 will eventually experience a higher vacuum pressure $P_2$ which is higher than the set pressure $P_{Set}$ and the sachet 110 is once again compressed. In this state the RFID tag is again shorted and becomes operable.

The RFID switch 220 can be read with an RFID reader from outside the VIP 400. When the RFID switch 220 is experiencing a lower vacuum pressure $P_1$ indicative of a properly functioning VIP 400, the RFID reader will read the operable RFID tag and signal that the VIP 400 remains operable. When the RFID switch 220 is experiencing a higher vacuum pressure $P_2$ indicative of a loss of vacuum and a failed VIP 400, the RFID reader will be unable to read the shorted RFID tag and signal that the VIP 400 has failed and should be replaced.

The RFID switch 220 can optionally be configured in reverse fashion so that the RFID tag is shorted when the RFID switch 220 is experiencing a lower vacuum pressure $P_1$. In this reverse configuration, when the RFID reader is able to read an operable RFID tag the reader will signal that the VIP 400 has failed and should be replaced.

Magnetic Switch Embodiment 320

Referring to FIG. 12A, during assembly the sachet 110 experiences atmospheric pressure $P_3$ which is higher that the set pressure $P_{Set}$ and the sachet 110 is compressed. This allows the actuator plate 328 to be biased into the engaged position. However, to avoid an immediate triggering of the magnetic switch 320 and reorientation of the magnetic poles N and S, the proximal end of the actuator plate 328 is positioned to press horizontally against the side of the other leg of the v-shaped pawl 325 rather than vertically downward so as to encourage the one leg of the v-shaped pawl 325 to remain lodged within the groove. This is the set position. In the set position the magnet 321 is configured with the North pole N proximate the top of the housing 331 and the South pole S proximate the bottom of the housing 332. This set orientation of the poles N and S can optionally be reversed.

Referring to FIG. 12B, after placing the magnetic switch embodiment 320 of the pressure transition indicator 100 into an evacuated and fully sealed VIP 400, the sachet 110 experiences lower vacuum pressure $P_1$ which is lower than the set pressure $P_{Set}$ and the sachet 110 is inflated. This causes the actuator plate 328 to slide past the v-shaped pawl 325 and rise into the disengaged position above the other leg of the v-shaped pawl 325. This is the armed position. In the armed position the North N and South S poles remain in the same orientation as in the set position.

Referring FIG. 12D, should the VIP 400 begin to fail the sachet 110 will eventually experience a higher vacuum pressure $P_2$ which is higher than the set pressure $P_{Set}$ and the sachet 110 is once again compressed. This allows the actuator plate 328 to be biased into the engaged position. As it moves into the engaged position it presses downward into forcible engagement against the other leg of the v-shaped pawl 325, thereby effecting removal of the one leg of the v-shaped pawl 325 from the groove (unnumbered) in the retention sleeve 322 and allowing biased rotation of the retention sleeve 322 to reorient the position the North N and South S poles with the South pole S now proximate the top 331 of the housing 330.

The magnetic switch 320 can be read with a magnetic pole detector (not shown) from outside the VIP 400. When the magnetic switch 320 is experiencing a lower vacuum pressure $P_1$ indicative of a properly functioning VIP 400, the magnetic pole detector (not shown) will detect orientation of the magnetic poles with the North pole N proximate the top 331 of the housing 330 and signal that the VIP 400 remains operable. When the magnetic switch 320 is experiencing a higher vacuum pressure $P_2$ indicative of a loss of vacuum and a failed VIP 400, the magnetic pole detector (not shown) will detect orientation of the magnetic poles with the South pole S proximate the top 331 of the housing 330 and signal that the VIP 400 has failed and should be replaced.

I claim:

1. A remotely interrogatable pressure transition indicator, comprising:
   (a) a pressure sensitive element operable for transitioning between first and second conditions induced by a change in external gaseous pressure experienced by the pressure sensitive element, and
   (b) a remotely interrogatable mechanical switch operable for transitioning between (i) a first state producing a first interrogatable value wherein the first state is indicative of a pressure induced status of the pressure sensitive element in the first condition representing a first external pressure experienced by the pressure sensitive element, and (ii) a second state producing a second interrogatable value different from the first interrogatable value, wherein the second state is indicative of a pressure induced status of the pressure sensitive element in the second condition representing a second external pressure experienced by the pressure sensitive element, wherein the first external pressure is lower than the second external pressure.

2. The pressure transition indicator of claim 1 wherein the pressure sensitive element is a hermetically sealed, gas impermeable, flexible walled sachet containing a quantity of gas at a set pressure wherein (i) the first condition of the pressure sensitive element is an inflated condition caused when the sachet experiences an external pressure lower than the set pressure, and (ii) the second condition of the pressure sensitive element is a compressed condition caused when the sachet experiences an external pressure higher than the set pressure.

3. The pressure transition indicator of claim 2 wherein:
   (a) the remotely interrogatable mechanical switch includes at least an RFID tag and a low electrical resistance connector, the low electrical resistance connector repositionable between an isolated position electrically separated from the RFID tag so as to render the RFID tag interrogatable and a shorting position in electrical shorting contact with the RFID tag so as to render the RFID tag uninterrogatable,
   (b) the low electrical resistance connector is biased towards the shorting position,
   (c) the low electrical resistance connector is located in the isolated position against the bias when the pressure sensitive element is in the first condition, and
   (d) the low electrical resistance connector is biased into the shorting position when the pressure sensitive element is in the second condition.

4. The pressure transition indicator of claim 3 wherein the sachet and the mechanical switch are enclosed within a chamber defined by a rigid housing and the sachet is sandwiched between the housing and the low electrical resistance connector whereby the sachet presses against the bias of the low electrical resistance connector when in the first condition.

5. The pressure transition indicator of claim 2 wherein:
   (a) the remotely interrogatable mechanical switch includes at least an RFID tag and a low electrical resistance connector, the low electrical resistance connector repositionable between an isolated position electrically separated from the RFID tag so as to render the RFID tag interrogatable and a shorting position in electrical shorting contact with the RFID tag so as to render the RFID tag uninterrogatable,
   (b) the low electrical resistance connector is biased towards the first isolated position,
   (c) the low electrical resistance connector is biased into the isolated position when the pressure sensitive element is in the second condition,
   (d) the low electrical resistance connector is located in the shorting position against the bias when the pressure sensitive element is in the first condition.

6. The pressure transition indicator of claim 5 wherein the sachet and the mechanical switch are enclosed within a chamber defined by a rigid housing and the sachet is sandwiched between the housing and the low electrical resistance connector whereby the sachet presses against the bias of the low electrical resistance connector when in the first condition.

7. The pressure transition indicator of claim 2 wherein the set pressure is between 1 and 200 mbars.

8. The pressure transition indicator of claim 1 wherein:
   (a) the remotely interrogatable mechanical switch includes at least an RFID tag and a low electrical resistance connector, the low electrical resistance connector repositionable between an isolated position electrically separated from the RFID tag so as to render the RFID tag interrogatable and a shorting position in electrical shorting interface with the RFID tag so as to render the RFID tag uninterrogatable,
   (b) the low electrical resistance connector is biased towards the shorting position,
   (c) the low electrical resistance connector is located in the isolated position against the bias when the pressure sensitive element is in the first condition, and
   (d) the low electrical resistance connector is biased into the shorting position when the pressure sensitive element is in the second condition.

9. The pressure transition indicator of claim 8 wherein the first interrogatable value is the transmission of data from the RFID tag upon reading of the RFID tag indicative of an operable RFID tag, and the second interrogatable value is the absence of any transmitted data upon reading of the RFID tag indicative of an inoperable RFID tag.

10. The pressure transition indicator of claim 8 wherein the first interrogatable value is the absence of any transmitted data upon reading of the RFID tag indicative of an inoperable RFID tag, and the second interrogatable value is the transmission of data from the RFID tag upon reading of the RFID tag indicative of an operable RFID tag.

11. The pressure transition indicator of claim 8 wherein the RFID tag is a passive low frequency RFID tag.

12. The pressure transition indicator of claim 1 wherein:
(a) the remotely interrogatable mechanical switch includes at least an RFID tag and a low electrical resistance connector, the low electrical resistance connector repositionable between an isolated position electrically separated from the RFID tag so as to render the RFID tag interrogatable and a shorting position in electrical shorting interface with the RFID tag so as to render the RFID tag uninterrogatable,
(b) the low electrical resistance connector is biased towards the first isolated position,
(c) the low electrical resistance connector is biased into the isolated position when the pressure sensitive element is in the second condition,
(d) the low electrical resistance connector is located in the shorting position against the bias when the pressure sensitive element is in the first condition.

13. The pressure transition indicator of claim 1 wherein the first interrogatable value is transmission of data when interrogated and the second interrogatable value is the absence of transmission of any data when interrogated.

14. The pressure transition indicator of claim 1 wherein the first interrogatable value is the absence of transmission of any data when interrogated and the second interrogatable value is transmission of data when interrogated.

15. The pressure transition indicator of claim 1 wherein transition of the pressure sensitive element between the first and second conditions occurs at a transition pressure point between 1 and 200 mbars.

16. The pressure transition indicator of claim 1 wherein:
(a) the remotely interrogatable mechanical switch includes at least (i) a magnet having north and south magnetic poles with the magnet repositionable from a first orientation of the north and south magnetic poles relative to a given plane for producing the first interrogatable value into a second orientation of the north and south magnetic poles relative to the given plane for producing the second interrogatable value, wherein the magnet is biased towards the second orientation, (ii) a restraining element repositionable from a first position retaining the magnet in the first orientation against the bias and a second position releasing the magnet so as to permit biased repositioning of the magnet into the second orientation, and (iii) an actuator plate repositionable from a disengaged position to an engaged position, wherein the actuator plate is biased towards the engaged position and wherein repositioning of the actuator plate from the disengaged position to the engaged position effects repositioning of the restraining element from the first position to the second position,
(b) the actuator plate is located in the disengaged position against the bias when the pressure sensitive element is in the first condition, and
(c) the actuator plate is biased into the engaged position when the pressure sensitive element is in the second condition.

17. The pressure transition indicator of claim 16 wherein the pressure sensitive element is a hermetically sealed, gas impermeable, flexible walled sachet containing a quantity of gas at a set pressure wherein (i) the first condition of the pressure sensitive element is an inflated condition caused when the sachet experiences an external pressure lower than the set pressure, and (ii) the second condition of the pressure sensitive element is a compressed condition caused when the sachet experiences an external pressure higher than the set pressure.

18. The pressure transition indicator of claim 17 wherein the sachet and the mechanical switch are enclosed within a chamber defined by a rigid housing and the sachet is sandwiched between the housing and the actuator plate whereby the sachet presses against the bias of the actuator plate when in the first condition.

19. The pressure transition indicator of claim 17 wherein the set pressure is between 1 and 200 mbars.

20. The pressure transition indicator of claim 16 wherein the first interrogatable value is detection of the north and south poles in the first orientation and the second interrogatable value is detection of the north and south poles in the second orientation.

* * * * *